(12) United States Patent
Speigle

(10) Patent No.: US 8,000,535 B2
(45) Date of Patent: Aug. 16, 2011

(54) METHODS AND SYSTEMS FOR REFINING TEXT SEGMENTATION RESULTS

(75) Inventor: Jon M. Speigle, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 995 days.

(21) Appl. No.: 11/764,733

(22) Filed: Jun. 18, 2007

(65) Prior Publication Data

US 2008/0310685 A1    Dec. 18, 2008

(51) Int. Cl.
  *G06K 9/46* (2006.01)
  *G06K 9/34* (2006.01)
  *G06K 9/36* (2006.01)
  *G06K 9/40* (2006.01)
  *H04N 1/40* (2006.01)

(52) U.S. Cl. ........ 382/194; 382/232; 382/254; 382/176; 358/462

(58) Field of Classification Search .................. 382/193, 382/194, 232, 254, 176; 358/462
See application file for complete search history.

(56) References Cited

U.S. PATENT DOCUMENTS

| | | | |
|---|---|---|---|
| 4,020,462 A | 4/1977 | Morrin, II | |
| 4,291,305 A | 9/1981 | Kimura et al. | |
| 4,292,622 A | 9/1981 | Henrichon, Jr. | |
| 4,504,969 A | 3/1985 | Suzuki et al. | |
| 4,633,502 A | 12/1986 | Namba | |
| 4,901,365 A | 2/1990 | Kelland | |
| 4,933,979 A | 6/1990 | Suzuki et al. | |
| 4,949,392 A | 8/1990 | Barski et al. | |
| 5,048,096 A | 9/1991 | Beato | |
| 5,048,107 A | 9/1991 | Tachikawa | |
| 5,121,222 A | 6/1992 | Endoh et al. | |
| 5,191,612 A | 3/1993 | Katsuyama et al. | |
| 5,386,508 A | 1/1995 | Itonori et al. | |
| 5,896,464 A | 4/1999 | Horiuchi et al. | |
| 5,898,795 A | 4/1999 | Bessho | |
| 5,946,416 A | 8/1999 | Akagi et al. | |
| 6,052,480 A | 4/2000 | Yabuki et al. | |
| 6,141,444 A | 10/2000 | Hasegawa | |
| 6,434,270 B1 | 8/2002 | Ohara et al. | |
| 6,654,495 B1 | 11/2003 | Katoh et al. | |
| 6,798,906 B1 | 9/2004 | Kato | |

(Continued)

FOREIGN PATENT DOCUMENTS

JP      9097309 A      4/1997

(Continued)

OTHER PUBLICATIONS

Japanese Office Action—Patent Application No. 2008-159585 (Japanese Counterpart to U.S. Appl. No. 11/764,733)—Mailing Date Feb. 15, 2011.

*Primary Examiner* — Kathleen S Dulaney
(74) *Attorney, Agent, or Firm* — Kristine E. Matthews; David C. Ripma

(57) ABSTRACT

Aspects of the present invention relate to systems and methods for refining text segmentation results. Non-text, line elements in a text map may be detected and removed from the text map. Pixels associated with vertical and/or horizontal lines may be identified in the text map based on a background-color constraint, a directional color constraint and a continuity constraint. Run counters and run-reset counters associated with a direction may be used to identify pixels meeting the continuity constraint.

13 Claims, 9 Drawing Sheets

U.S. PATENT DOCUMENTS

| | | |
|---|---|---|
| 6,873,436 B1 | 3/2005 | Terada et al. |
| 7,856,142 B2 | 12/2010 | Ferman et al. |
| 2002/0039439 A1* | 4/2002 | Nacken ........................ 382/165 |
| 2005/0201620 A1* | 9/2005 | Kanamoto et al. ............ 382/182 |
| 2008/0205753 A1 | 8/2008 | Chen et al. |

FOREIGN PATENT DOCUMENTS

| | | |
|---|---|---|
| JP | 2001307019 A | 11/2001 |
| JP | 2002175532 A | 6/2002 |
| JP | 2004145634 A | 5/2004 |

* cited by examiner

METHODS AND SYSTEMS FOR REFINING TEXT SEGMENTATION RESULTS

FIELD OF THE INVENTION

Embodiments of the present invention comprise methods and systems for refining text segmentation results.

BACKGROUND

The content of a digital image may have considerable impact on the compression of the digital image, both in terms of compression efficiency and compression artifacts. Pictorial regions in an image may not be efficiently compressed using compression algorithms designed and optimized for the compression of text. Similarly, text images may not be efficiently compressed using compression algorithms that are designed and optimized for pictorial content. Not only can the compression efficiency suffer when a compression algorithm designed for one type of image content is used on a different type of image content, but the decoded image may exhibit annoying compression artifacts.

Additionally, image enhancement algorithms designed to sharpen text, if applied to pictorial image content, may produce visually annoying artifacts in some areas of the pictorial content. In particular, areas in a pictorial region containing strong edges similar to text may be sharpened producing a visually displeasing image. While smoothing operations may enhance a natural image, the smoothing of text regions is seldom desirable.

The detection of regions of a particular content type in a digital image may improve compression efficiency, reduce compression artifacts, and improve image quality when used in conjunction with a compression algorithm or image enhancement algorithm designed for the particular type of content.

SUMMARY

Some embodiments of the present invention comprise methods and systems for detecting non-text, line elements in a text map and removing this non-text structure from the text map. Some embodiments of the present invention comprise identifying line pixels in a text map based on a background-color constraint, a directional color constraint and a continuity constraint.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

FIG. 1 is a chart showing embodiments of the present invention comprising detecting lines in a text map and removing non-text structure from the text map;

FIG. 2. is a chart showing embodiments of the present invention comprising detecting vertical runs in a text map;

FIG. 10A is a picture showing an exemplary pattern for noise removal;

FIG. 10B is a picture showing an exemplary pattern for noise removal;

FIG. 10C is a picture showing an exemplary pattern for noise removal; and

FIG. 10D is a picture showing an exemplary pattern for noise removal.

DETAILED DESCRIPTION OF EXEMPLARY EMBODIMENTS

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Figure 1:
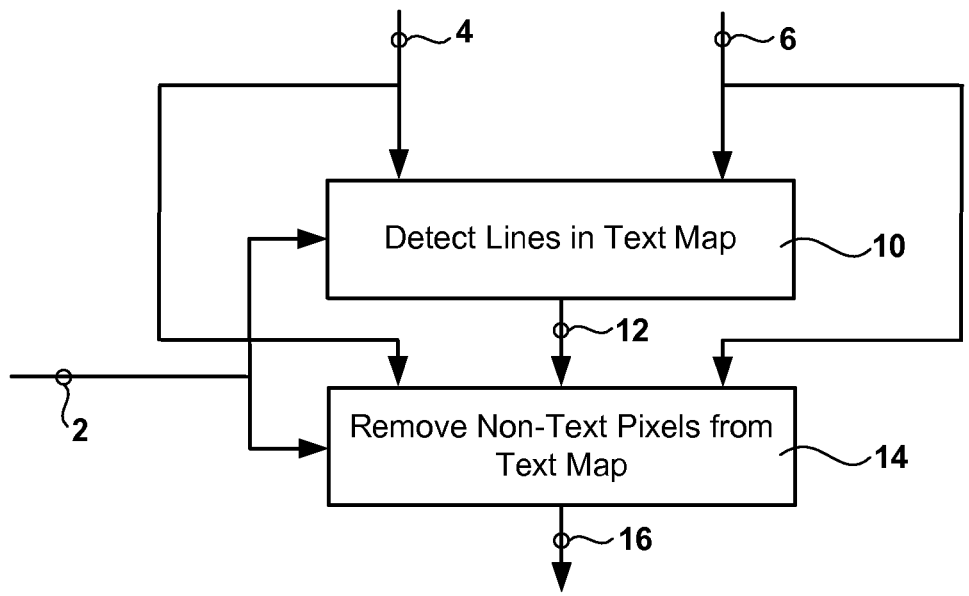

Some embodiments of the present invention, described in relation to FIG. 1, may comprise methods and systems for removing line structure, and other non-text elements, from a text segmentation map. In these embodiments, lines in a text map 2 may be detected 10 using corresponding image data 4 and a background estimate 6. The output of the line detection process may be a line map 12 which may be used in conjunction with the text map 2, image data 4 and background estimate 6 to remove 14 non-text pixels from the text map 2, thereby producing a refined text map 16.

In some embodiments of the present invention, the text map 2 may be a binary image, array or other data structure, in which the binary value of a pixel at a location in the text map 2 may indicate whether or not the corresponding pixel in the image data 4 may be part of a text character. The text map 2 may contain responses at the edges of text characters, the interior of text characters, background transitions, the edges of graphics, the interior of graphics, lines, such as those found in forms, and other areas of high-frequency content in the image data 4.

In alternative embodiments of the present invention, the text map 2 may be a multi-valued image, array or other data structure, in which the value of a pixel at a location in the text map 2 may indicate a certainty measure for the corresponding pixel in the image data 4. The certainty measure may indicate the membership value of the pixel in the text class.

In some embodiments of the present invention, the text map 2 and the image data 4 may be at the same spatial resolution. In alternative embodiments, the spatial resolutions of the text map 2 and the image data 4 may be different resolutions.

In some embodiments of the present invention, the image data 4 may be multi-channel, color image data. Exemplary multi-channel color spaces may comprise RGB, CMYK, Yuv, L*a*b*, YCbCr, Lab, XYZ, YIQ, any luma-chroma-chroma color space and any other color space known in the art. In alternative embodiments, the image data 4 may be single-channel data, for example luminance data, combined multi-channel data, a single channel from a multi-channel representation or any other single-channel color space known in the art.

In some embodiments of the present invention, the line map 12 may be a binary image, array or other data structure, in which the binary value of a pixel at a location in the line map 12 may indicate whether or not the corresponding pixel in the image data 4 may be part of a line. The line map 12 may contain responses at pixels which may be detected as part of a vertical line or a horizontal line.

In alternative embodiments of the present invention, the line map 12 may be a multi-valued image, array or other data structure, in which the value of a pixel at a location in the line map 12 may indicate a certainty measure for the corresponding pixel in the image data 4. The certainty measure may indicate the membership value of the pixel in the line class.

Figure 2:
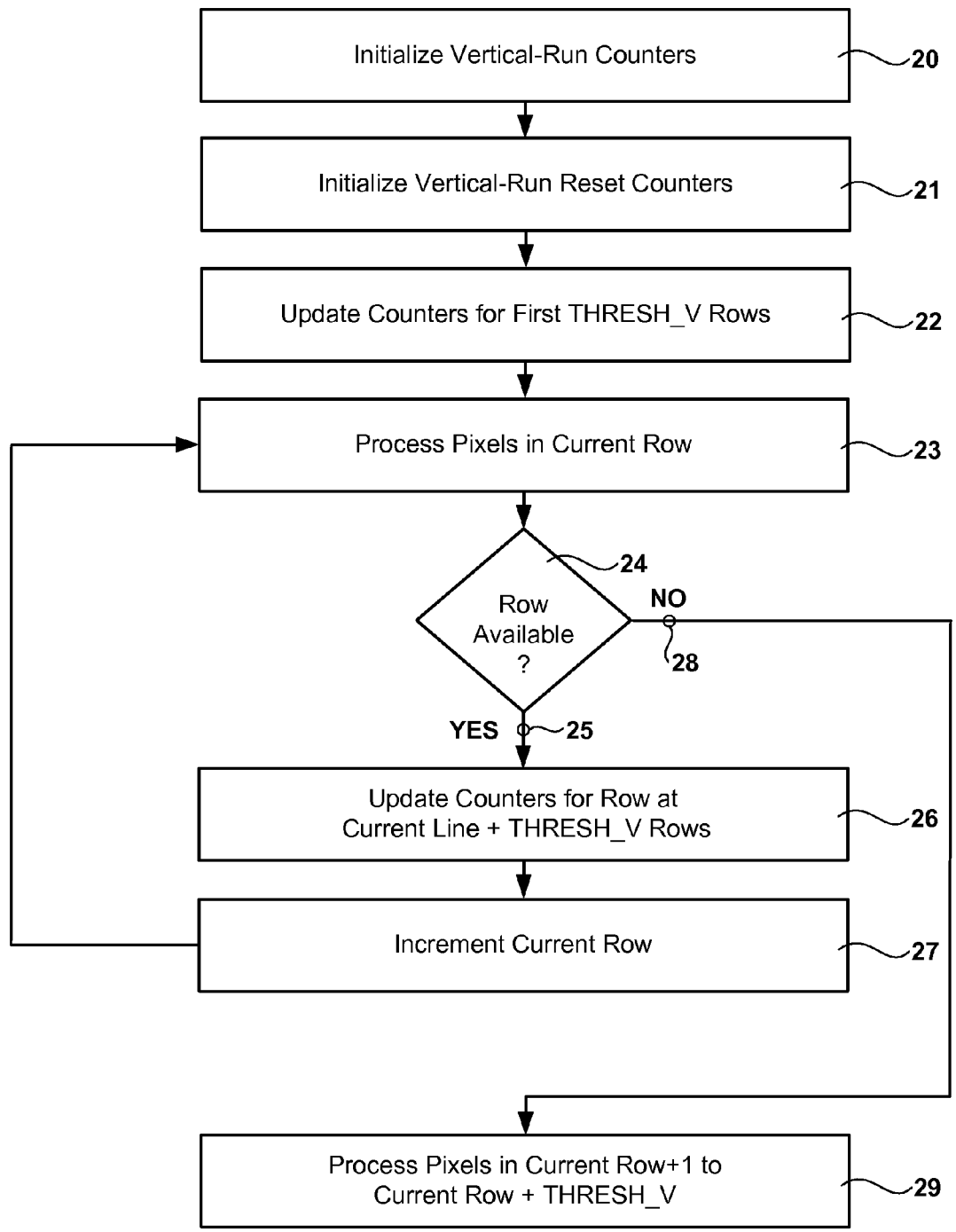

In some embodiments of the present invention, described in relation to FIG. 2, the text map 2 may be examined to identify substantially contiguous, vertical runs of pixels identified as text by the text map 2. These pixels may be indicated in the line map 12. In these embodiments, a set of vertical-run counters may be used. The vertical-run counters may be initialized 20. In some embodiments of the present invention, each of the vertical-run counters may be initialized 20 to zero. A set of vertical-run reset counters may be used in these embodiments of the present invention. The vertical-run reset counters may be initialized 21. In some embodiments of the present invention, each of the vertical-run reset counters may be initialized 21 to zero. The set of vertical-run counters may comprise a set of counters in which there may be a counter associated with each column in the text map 2. For example, a text map 2 that is 5100 pixels wide may have a set of 5100 vertical-run counters. The vertical-run counter associated with column i may be denoted runV[i]. The set of vertical-run reset counters may comprise a set of counters in which there may be a counter associated with each column in the text map 2. For example, a text map 2 that is 5100 pixels wide may have a set of 5100 vertical-run reset counters. The vertical-run counter reset associated with column i may be denoted runV_reset[i].

In some embodiments of the present invention, a pixel may be labeled as a line pixel in the line map 14 if the pixel is part of a vertical run of length greater than a threshold, denoted THRESH_V. In some embodiments of the present invention, a threshold of 150 pixels may be used, which for a 300 dpi (dots per inch) input corresponds to a 0.5 inch continuous sequence of text pixels. After initializing the vertical-run counters 20 and the vertical-run reset counters 21, the vertical-run counters and the vertical-run reset counters may be updated 22 for the first THRESH_V rows of the text map 2.

In some embodiments of the present invention, if the next pixel in a column, for example column k, of the text map 2 is a text pixel, then the runV counter for that column, for example runV[k], may be incremented. If the pixel is not a text pixel, then the runV_reset counter for that column, for example runV_reset[k], may be set to the value of the runV counter for that column, for example runV[k], and the runV counter for that column, for example runV[k], may then be reset to zero. In alternative embodiments, the vertical-run reset counters may not be updated when initially accumulating runs for the first THRESH_V rows.

In alternative embodiments, the runV counter for a column may be incremented if the row pixel in the column is a text pixel or if any of the next $N_{GAPV}$ pixels are text pixels, where $N_{GAPV}$ is an integer. In these embodiments, small gaps in the continuity of a vertical line may be tolerated.

Figure 3:
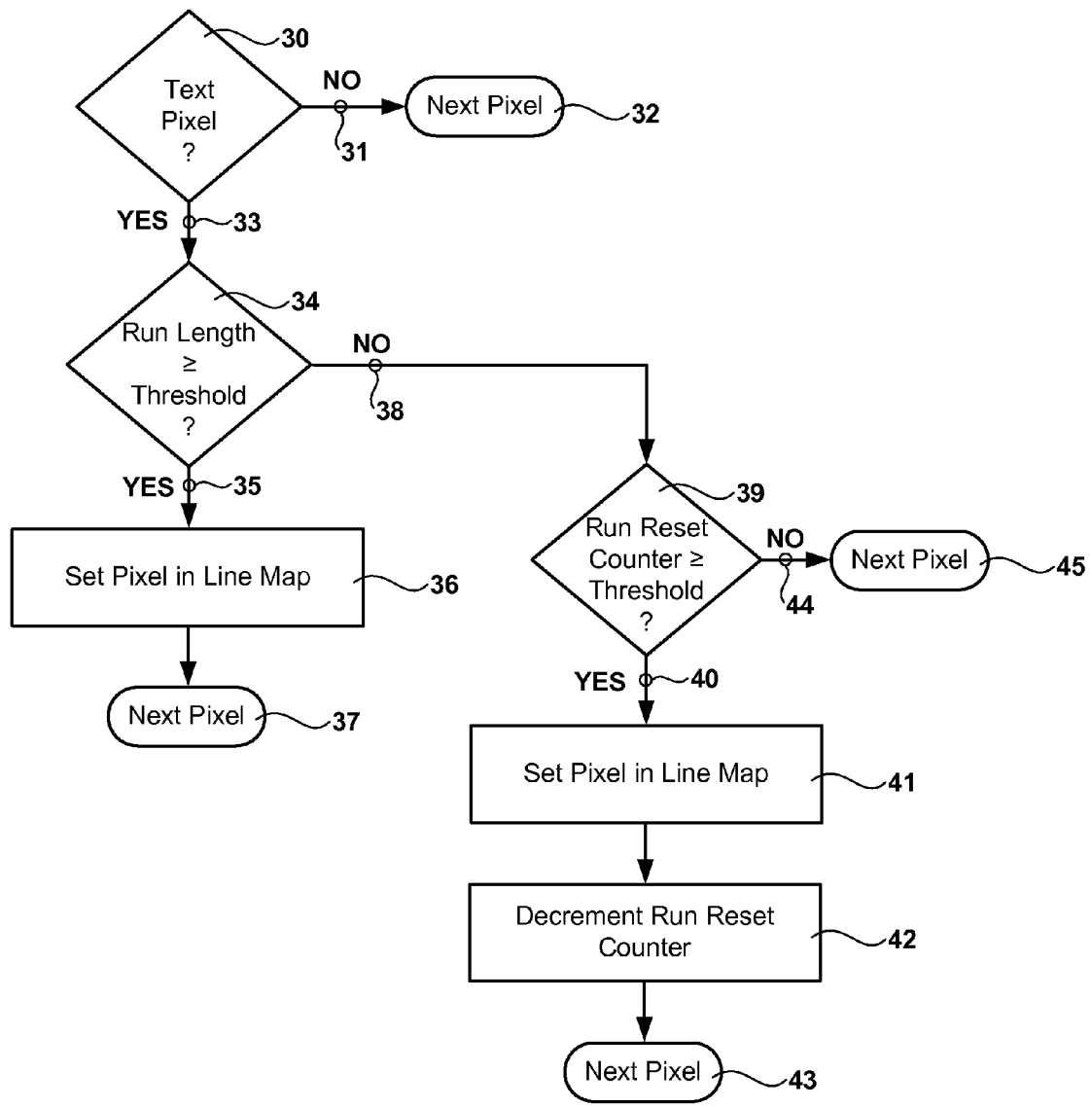
FIG. 3 is a chart showing embodiments of the present invention comprising detecting vertical runs in a text map using run counters and reset counters.

After the vertical-run counters and vertical-run reset counters have been updated 22 for the first THRESH_V rows of the text map 2, then the pixels in the current row, initially the first row, of the text map 2 may be processed 23. For some embodiments of the present invention, the processing 23 may be described according to FIG. 3.

A pixel in the current row of the text map 2 may be examined to determine if the pixel is a text pixel 30. If a pixel value in the text map 2 indicates that it is not a text pixel 31, then the next pixel in the current row may be examined 32. If the pixel value in the current row of the text map 2 indicates that it is a text pixel 33, then the vertical-run counter corresponding to the pixel location may be examined 34. If the value of the vertical-run counter is greater 35 than the run-length threshold, THRESH_V, then the corresponding pixel may be set in the line map 36, and the next pixel in the current row may be examined 37. If the value of the vertical-run counter is not greater 38 than the run-length threshold, THRESH_V, then the vertical-run reset counter corresponding to the pixel location may be examined 39. If the value of the vertical-run reset counter is greater 40 than the run-length threshold, THRESH_V, then the corresponding pixel may be set in the line map 41. The vertical-run reset counter may be decremented 42, and the next pixel in the current row may be examined 43. If the value of the vertical-run reset counter is not greater 44 than the run-length threshold, THRESH_V, then the next pixel in the current row may be examined 45.

When all of the pixels in the current row have been examined, it may be determined 24 if there is an additional row available which has not been accumulated in the vertical-run counters and the vertical-run reset counters. If there is an additional row available 25, then the vertical-run counters and the vertical-run reset counters may be updated 26 for the available row.

In some embodiments of the present invention, if the pixel in the additional row, in a column, for example column k, of the text map 2 is a text pixel, then the runV counter for that column, for example runV[k], may be incremented. If the pixel is not a text pixel, then the runV_reset counter for that column, for example runV_reset[k], may be set to the value of the runV counter for that column, for example runV[k], and the runV counter for that column, for example runV[k], may then be reset to zero.

In alternative embodiments, the runV counter for a column may be incremented if the row pixel in the column is a text pixel or if any of the next $N_{GAPV}$ pixels are text pixels, where $N_{GAPV}$ is an integer. In these embodiments, small gaps in the continuity of a vertical line may be tolerated.

The current row may be incremented 27, and the pixels in the new, current row may be processed 23. If there is not an additional row available 28, then the remaining row may be processed 29. The processing of each remaining row may be according to FIG. 3 as described above.

Figure 4:
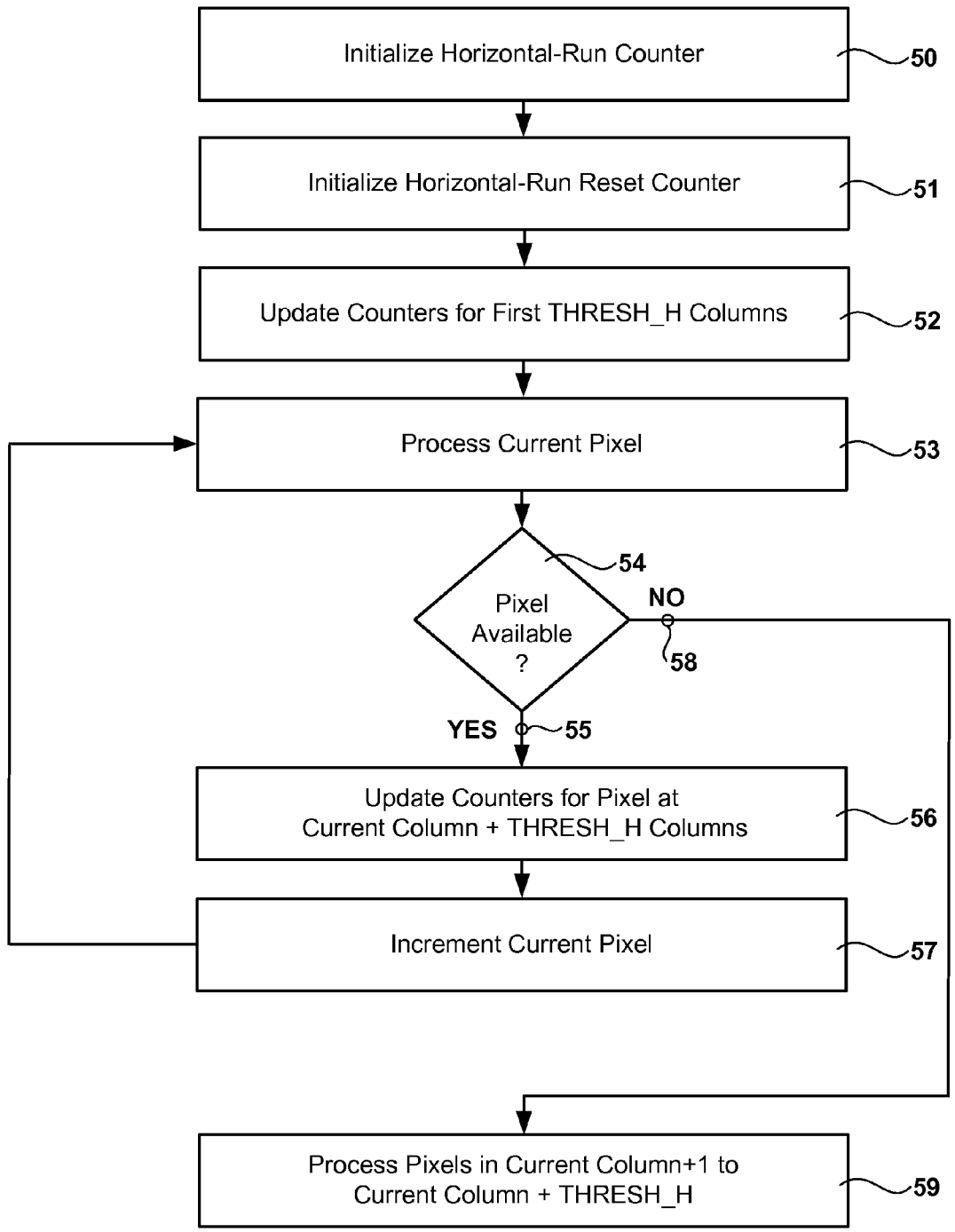
FIG. 4 is a chart showing embodiments of the present invention comprising detecting horizontal runs in a text map.

In some embodiments of the present invention, the text map 2 may be examined to identify substantially contiguous, horizontal runs of pixels identified as text by the text map 2. These pixels may be indicated in the line map 12. In some embodiments of the present invention, each row of pixels in the text map 2 may be processed according to the process depicted in FIG. 4. A horizontal-run counter, runH, may be initialized 50. In some embodiments of the present invention, the horizontal-run counter may be initialized 50 to zero. A horizontal-run reset counter, runH_reset, may be initialized 51. In some embodiments of the present invention, the horizontal-run reset counter may be initialized 51 to zero.

In some embodiments of the present invention, a pixel may be labeled as a line pixel in the line map 14 if the pixel is part of a horizontal run of length greater than a threshold, denoted THRESH_H. In some embodiments of the present invention, a threshold of 150 pixels may be used, which for a 300 dpi input corresponds to a 0.5 inch continuous sequence of text pixels. After initializing the horizontal-run counter 50 and the horizontal-run reset counter 51, the horizontal-run counter and the horizontal-run reset counter may be updated 52 for the first THRESH_H pixels in the row of the text map 2.

In some embodiments of the present invention, if the next pixel in the row of the text map 2 is a text pixel, then the runH counter may be incremented. If the pixel is not a text pixel, then the runH_reset counter may be set to the value of the runH counter, and the runH counter may then be reset to zero. In alternative embodiments, the horizontal-run reset counter may not be updated when initially accumulating the run for the first THRESH_H pixels.

In alternative embodiments, the runH counter may be incremented if the next pixel in the row is a text pixel or if any of the next $N_{GAPH}$ pixels are text pixels, where $N_{GAPH}$ is an integer. In these embodiments, small gaps in the continuity of a horizontal line may be tolerated.

Figure 5:
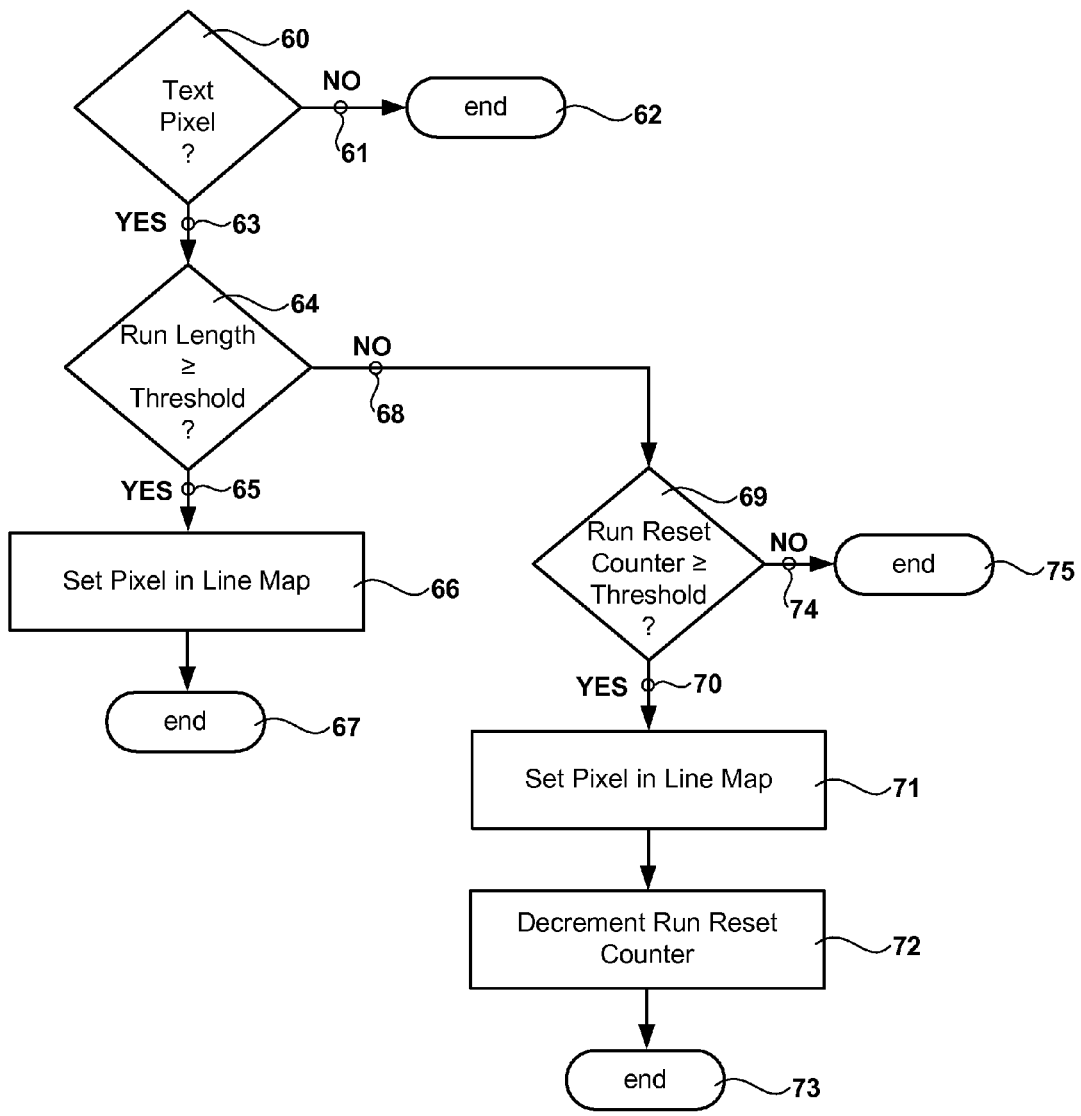
FIG. 5 is a chart showing embodiments of the present invention comprising detecting horizontal runs in a text map using a run counter and a reset counter.

After the horizontal-run counter and horizontal-run reset counter have been updated 52 for the first THRESH_H pixels of the current row, then the current pixel, initially the first pixel in the row, may be processed 53. For some embodiments of the present invention, the processing 53 may be described according to FIG. 5.

The current pixel in the row of the text map 2 may be examined to determine if the pixel is a text pixel 60. If a pixel value in the text map 2 indicates that it is not a text pixel 61, then the processing of the current pixel may end 62. If the pixel value in the text map 2 indicates that it is a text pixel 63, then the horizontal-run counter may be examined 64. If the value of the horizontal-run counter is greater 65 than the run-length threshold, THRESH_H, then the corresponding pixel may be set in the line map 66, and the processing of the current pixel may end 67. If the value of the horizontal-run counter is not greater 68 than the run-length threshold, THRESH_H, then the horizontal-run reset counter may be examined 69. If the value of the horizontal-run reset counter is greater 70 than the run-length threshold, THRESH_H, then the corresponding pixel may be set in the line map 71. The horizontal-run reset counter may be decremented 72, and the processing of the current pixel may end 73. If the value of the horizontal-run reset counter is not greater 74 than the run-length threshold, THRESH_H, then the processing of the current pixel may end 75.

After the current pixel has been processed 53, it may be determined 54 if there is an additional pixel available which has not been accumulated in the horizontal-run counter and the horizontal-run reset counter. If there is an additional pixel available 55, then the horizontal-run counter and the horizontal-run reset counter may be updated 56 for the available pixel.

In some embodiments of the present invention, if the next available pixel in the row is a text pixel, then the runH counter may be incremented. If the pixel is not a text pixel, then the runH_reset counter may be set to the value of the runH counter, and the runH may then be reset to zero.

In alternative embodiments, the runH counter may be incremented if the next available pixel in the row is a text pixel or if any of the next $N_{GAPH}$ pixels are text pixels, where $N_{GAPH}$ is an integer. In these embodiments, small gaps in the continuity of a horizontal line may be tolerated.

The current pixel may be incremented 57, and the current pixel may be processed 53. If there is not an additional pixel available 58, then the remaining pixels in the row may be processed 59, and the next row in the text map 2 may then be processed according to FIG. 4.

Figure 6:
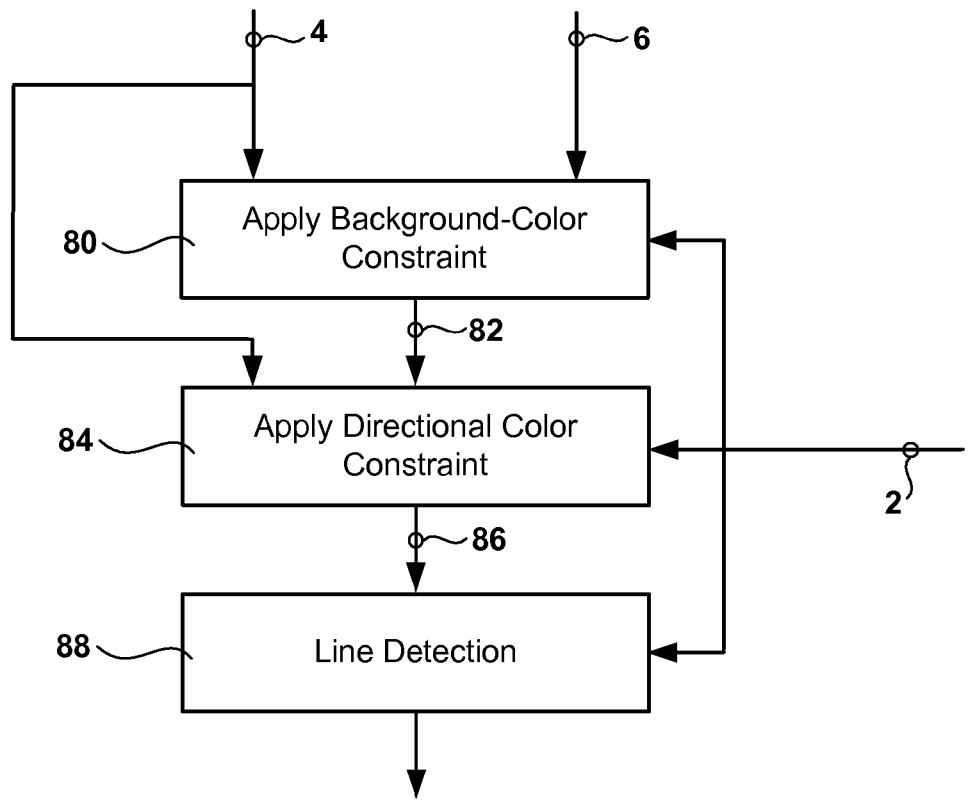
FIG. 6 is a chart showing embodiments of the present invention comprising imposing a background-color constraint and directional color constraints on a text map prior to line detection.

In some embodiments of the present invention, described in relation to FIG. 6, color constraints may be applied to reduce the number of false positive lines detected in the line detection methods and systems described above. Initially a background-color constraint may be applied 80 at a text map 2 pixel under examination. If the pixel under examination is identified as a text pixel, the image data 4 color value associated with the pixel may be compared to a background-color estimate 6 for the pixel. If the color of the image pixel is substantially similar to the background color, then the pixel may be removed from the text map 2. In some embodiments of the present invention similarity may be measured by computing the distance between the color coordinate of the image color and the color coordinate of the background color. Exemplary distance measures may comprise an $L_1$ norm, an $L_2$ norm, a 2-dimensional city block distance measure between the chroma components of a luma-chroma-chroma color space representation, a 3-dimensional city block distance measure between the components of a 3-dimensional color space representation, a Euclidean distance measure, a weighted 2-dimensional city block distance measure between the chroma components of a luma-chroma-chroma color space representation, a weighted 3-dimensional city clock distance between the components of a 3-dimensional color space representation, Euclidean metrics, Minkowski metrics and other well-known-in-the-art distance measures.

If the pixel is still identified as a text pixel in the updated text map 82, then a directional color constraint may be applied 84. The directional color constraint may impose a restriction that detected line pixels be of similar color. The vertical color constraint may be implemented as a 2×3 windowed operation. The color difference may be computed across rows for each column in the window. The horizontal color constraint may be implemented as a 3×2 windowed operation. The color difference may be computed across columns for each row in the window. The examination pixel color may be marked as the same as the line color whenever any of the color differences are below a threshold. If the color constraint is met, then the pixel in the updated text map 86 may counted in the line detection 88 counters.

In some embodiments of the present invention, the text map may be preprocessed to determine text-map pixels which satisfy the color constraints. In these embodiments, intermediary text maps may be used for vertical and/or horizontal line detection. In alternative embodiments, the color constraints may be determined when accumulating text pixels in the counters and examining the text pixels for continuity.

In some embodiments of the present invention, horizontal lines and vertical lines may be detected in separate passes. In alternative embodiments, horizontal lines and vertical lines may be detected in a single pass with a line day in the horizontal line detection path.

Figure 7:
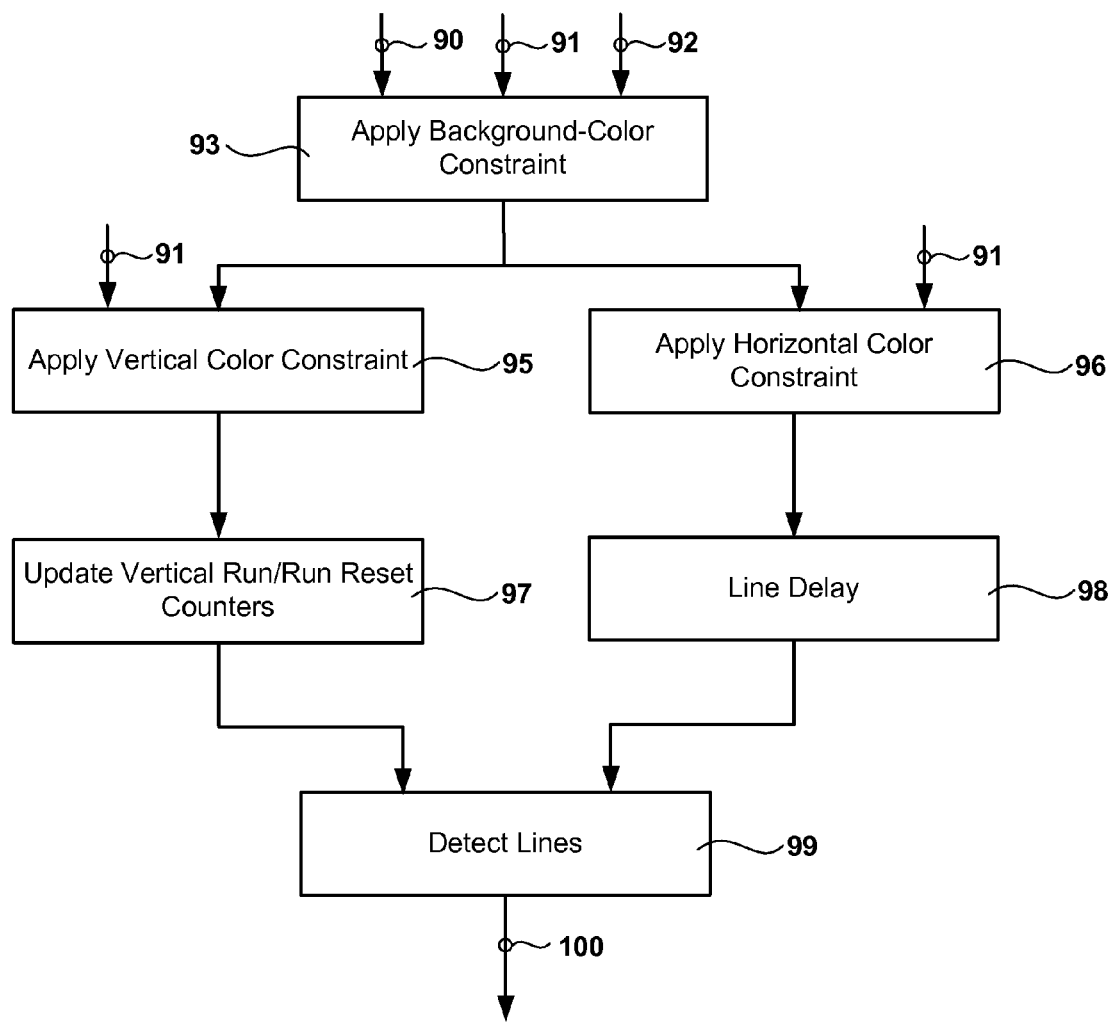
FIG. 7 is a chart showing embodiments of the present invention comprising imposing color constraints and horizontal and vertical line detection.

Exemplary embodiments of the present invention may be described in relation to FIG. 7. In these embodiments, a background-color constraint may be applied 93 relative to a pixel in a text map 90, considered the examination pixel. The background-color constraint may be based on the distance between the corresponding image color data 91 and a background color estimate 92. A vertical color constraint may be applied 95 based on the image color data 91 in a region around the examination pixel. A horizontal color constraint may also be applied 96 in a region around the examination pixel. Vertical counters used for vertical line detection may be updated 97 based on the color constraint results. Horizontal line detection may be delayed 98 based on the vertical line detection threshold so that a line decision 99 at a given pixel may be made for both the horizontal and vertical directions at the same time. The resulting line map 100 may, in some embodiments, be used to remove line pixels from the text map 90.

Figure 8:
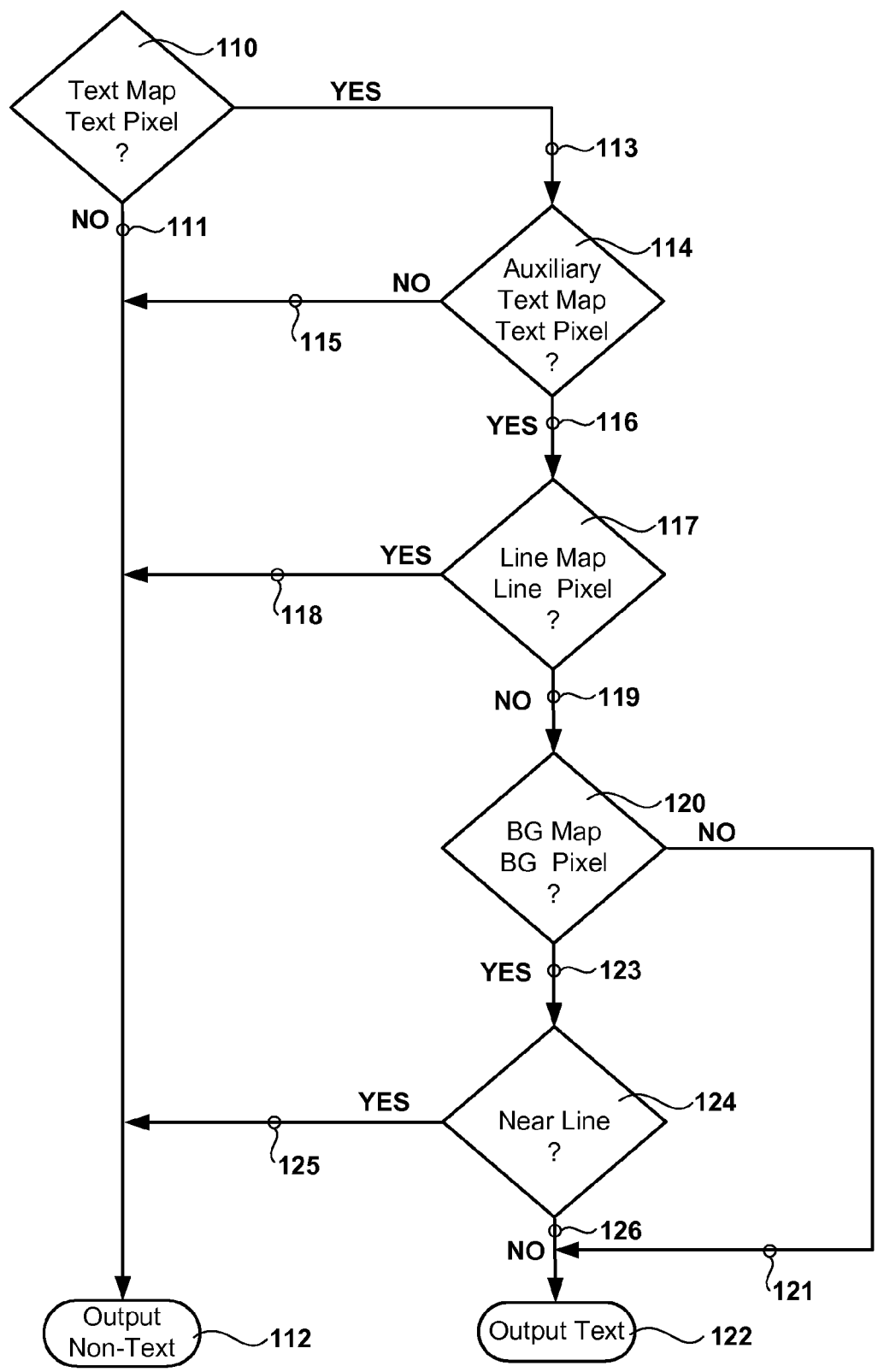
FIG. 8 is a chart showing embodiments of the present invention comprising removal of non-text structure from a text map.

In some embodiments of the present invention, pixels identified as line pixels in the line map may be removed from the text map. In alternative embodiments, dilated lines from the line map may be removed from the text map. In still alternative embodiments, additional classification results may be used to refine the text map. FIG. 8 shows an exemplary embodiment in which multiple classification results may be used to refine a text map. A text map pixel may be examined 110 to determine if the pixel is labeled as a text pixel. If not a text pixel 111, then the output may be a non-text label 112. If the pixel is labeled as a text pixel 113 in the text map, the corresponding pixel in an auxiliary text map may be examined 114. If the pixel is labeled as a non-text pixel 115 in the auxiliary text map, then the output may be a non-text label 112. If the pixel is labeled as text pixel 116 in the auxiliary text map, then the corresponding pixel in a line map may be examined 117. If the pixel in the line map is labeled as a line pixel 118, then the output may be a non-text label 112. If the pixel in the line map is not a line pixel 119, then the corresponding pixel in a background map may be examined 120. If the pixel is not a background pixel 121, then the output may be a text label 122. If the pixel is a background pixel 123, then the proximity to a line may be determined 124. If the background pixel is near a line 125, then the output may be a non-text label 112. If the pixel is not near a line 126, then the output may be a text label 122.

In some embodiments of the present invention, after removing lines from a text map based on a line map, additional filtering of the text map may be performed. The additional filtering may remove residual lines left after the initial processing. In some embodiments, a single-pixel-width line removal process may be used.

Figure 9:
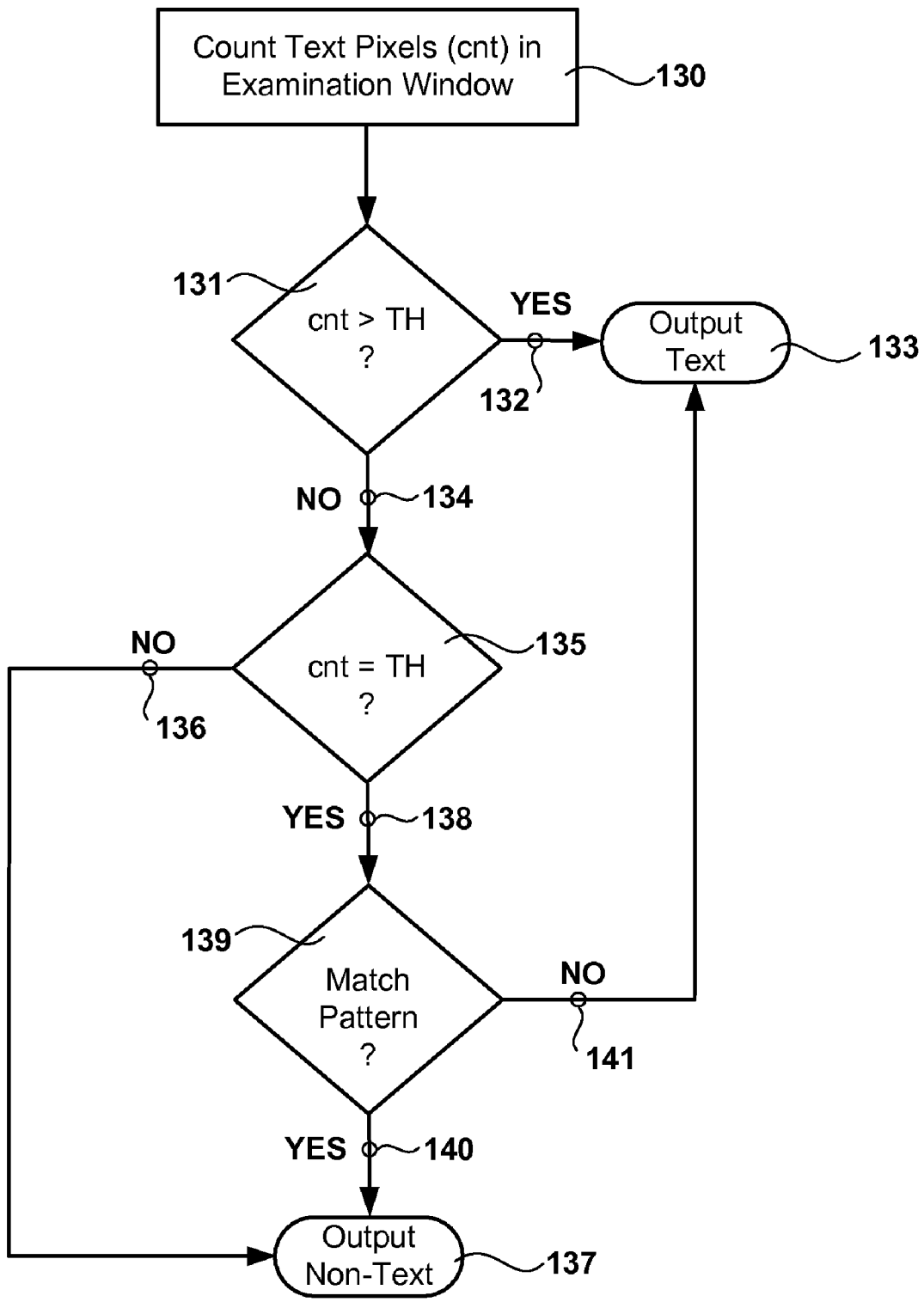
FIG. 9 is a chart showing embodiments of the present invention comprising noise removal.
Figures 10A, 10B, 10C, 10D:
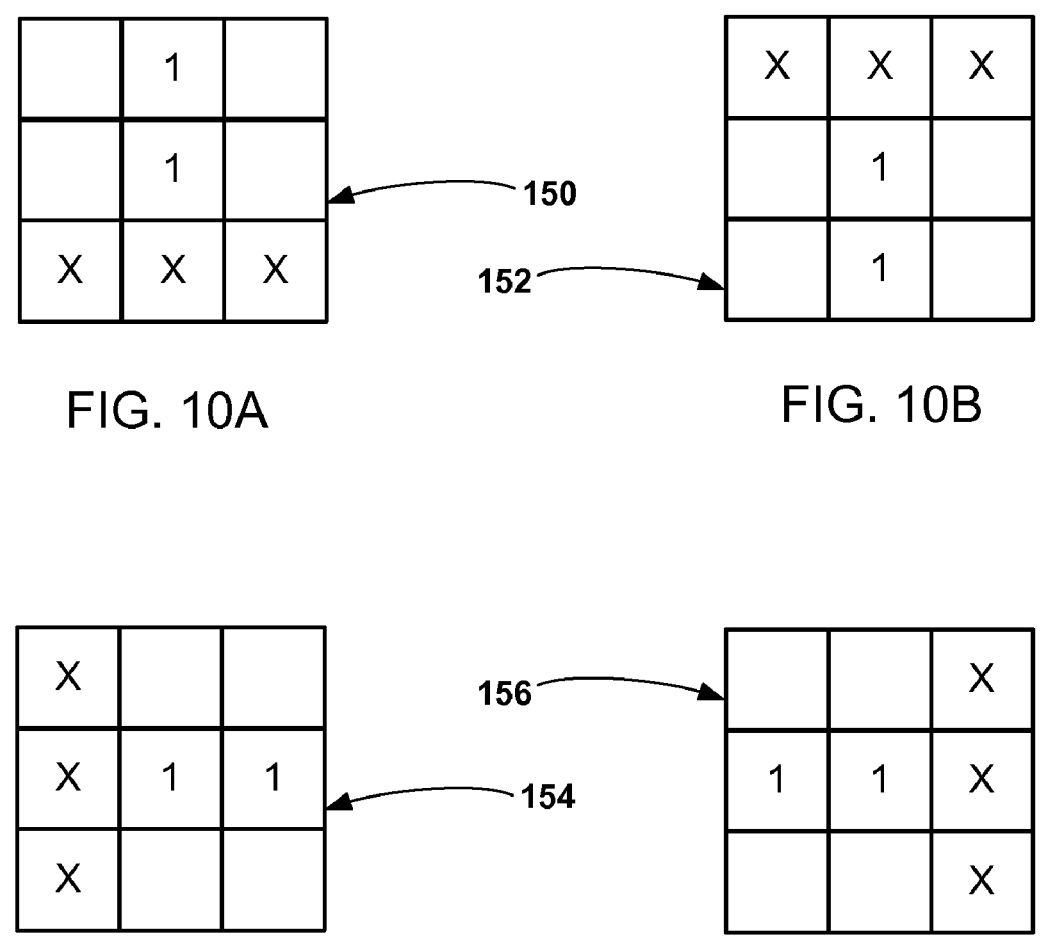

FIG. 9 depicts an exemplary removal process. In these embodiments, the number of text pixels in an examination window centered on a pixel of interest may be counted 130. Exemplary examination windows may comprise square windows, rectangular windows and other shaped windows of various sizes. The number of text pixels (cnt) within the examination window may be compared to a threshold 131. In some embodiments of the present invention, the threshold may be three. If the number of text pixels is sufficiently large 132 (for example, greater than the threshold), then the pixel of interest may be labeled a text pixel 133. If the number of pixels is not sufficiently large 134 (for example, less than or equal to the threshold), then the number of text pixels may be compared to the threshold 135. If the number of text pixels is not equal to the threshold 136, then the pixel of interest may be labeled a non-text pixel 137. If the number of text pixels is equal to the threshold 138, then the examination window may be compared to at least one pattern 139. Exemplary patterns 150, 152, 154, 156, for an exemplary square examination window of size 3×3, are shown in FIGS. 10A-10D. For these exemplary patterns, a pattern may be matched if the pixels indicated by a '1' are matched and any of the pixels indicated by an 'x' are a one value. If any of the patterns are matched 140, then the pixel of interested may be labeled a non-text pixel 137. If none of the patterns are matched 141, then the pixel of interest may be labeled a text pixel 133.

In alternative embodiments, the windowed operation described by FIG. 9 may be implemented as a lookup operation into a binary filter where each noise pattern may be explicitly represented.

Alternative embodiments may comprise rejection of all 4- or 8-way connected pixels to an initial line-map seed image. In some embodiments, the dilation characteristics of the initial text map may be measured to determine the level of aggressive filtering.

In some embodiments of the present invention, the text map and the line map may be the same resolution. In alternative embodiments of the present invention, a lower resolution line map may be generated. These embodiments may result in lower computational cost. For example, rejection based on a 75 dpi line map for a 300 dpi text map may yield similar results to dilating a 300 dpi line map with a 5×5 structuring element.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for detecting a line structure in a text map, said method comprising:
   determining a pixel-of-interest in a text map, said pixel-of-interest (POI) comprising:
      an associated pixel location;
      a POI text-map value; and
      a POI associated image color value;
   identifying said POI as a line pixel when:
      said POI text-map value indicates said POI is a text pixel and a value of a first-direction run counter associated with said associated pixel location is greater than a first-direction run-length threshold;
   identifying said POI as a line pixel when:
      said POI text-map value indicates said POI is a text pixel and a value of a first-direction run reset counter associated with said associated pixel location is greater than said first-direction run-length threshold; and
   decrementing said first-direction run reset counter associated with said associated pixel location when said POI text-map value indicates said POI is a text pixel and said value of said first-direction run reset counter associated with said associated pixel location is greater than said first-direction run-length threshold.

2. A method according to claim 1 further comprising applying a color constraint at said POI, wherein said color constraint is a background-color constraint based on said POI associated image color value and a POI associated background color value.

3. A method according to claim 2, wherein said background-color constraint is a background-similarity constraint.

4. A method according to claim 3 further comprising:
calculating a first color distance between said POI associated background color value and said POI associated image color value;
determining said background-color constraint is met when said first color distance meets a background-similarity criterion; and
when said background-color constraint is met, setting said POI text-map value to indicate said POI is not a text pixel.

5. A method according to claim 4, wherein said first color distance is a distance measure selected from the group consisting of $L_1$ norm, $L_2$ norm, Euclidean distance, city-block distance, weighted city-block distance and weighted Euclidean distance.

6. A method according to claim 1 further comprising applying color constraint at said POI, wherein said color constraint is a directional color constraint based on a region substantially near to said POI.

7. A method according to claim 6, wherein said directional color constraint is a directional color-similarity constraint.

8. A method according to claim 7, wherein:
a first direction is associated with said directional color constraint;
said first direction is associated with a directional continuity constraint;
said region comprises a plurality of pixel pairs proximate to said POI, wherein each of said plurality of pixel pairs are oriented in said first direction and wherein each of said plurality of pixel pairs comprises an associated pair of image color values; and
further comprising:
calculating a color difference for each of said associated pair of image color values, thereby producing a plurality of pixel-pair color differences;
determining said directional color constraint is met when at least one of said plurality of pixel-pair color differences meets a threshold criterion; and
only identifying said POI as a line pixel when said directional color constraint is met.

9. A method according to claim 7, wherein said color difference is a distance measure selected from the group consisting of $L_1$ norm, $L_2$ norm, Euclidean distance, city-block distance, weighted city-block distance and weighted Euclidean distance.

10. A method according to claim 1 further comprising applying:
a background-color constraint based on said POI associated image color value and a POI associated background color value; and
a directional color constraint based on a region substantially near to said POI.

11. A method according to claim 1 further comprising changing said POI text-map value to indicate said POI is not classified as a text character when said POI is identified as a line pixel.

12. A method according to claim 1, wherein said identifying said POI as a line pixel comprises setting a pixel associated with said POI in a line map to a first value.

13. A method according to claim 1 further comprising:
determining a first plurality of pixels from a first region, wherein said first plurality of pixels forms a substantially continuous run of pixels in a first direction; and
determining a directional continuity constraint is met when the number of pixels in said first plurality of pixels meets a quantity criterion.

* * * * *

UNITED STATES PATENT AND TRADEMARK OFFICE
CERTIFICATE OF CORRECTION

| | | |
|---|---|---|
| PATENT NO. | : 8,000,535 B2 | Page 1 of 1 |
| APPLICATION NO. | : 11/764733 | |
| DATED | : August 16, 2011 | |
| INVENTOR(S) | : Jon M. Speigle | |

It is certified that error appears in the above-identified patent and that said Letters Patent is hereby corrected as shown below:

Col. 9, Line 2, Claim 6, should read ing a color constraint at said POI, wherein said color constraint Signed and Sealed this
Thirty-first Day of January, 2012

David J. Kappos
*Director of the United States Patent and Trademark Office*

UNITED STATES PATENT AND TRADEMARK OFFICE
CERTIFICATE OF CORRECTION

PATENT NO.      : 8,000,535 B2
APPLICATION NO. : 11/764733
DATED           : August 16, 2011
INVENTOR(S)     : Jon M. Speigle It is certified that error appears in the above-identified patent and that said Letters Patent is hereby corrected as shown below:

Column 9, line 23 (Claim 6, line 2) should read ing a color constraint at said POI, wherein said color constraint This certificate supersedes the Certificate of Correction issued January 31, 2012.

Signed and Sealed this
Twenty-first Day of February, 2012

David J. Kappos
*Director of the United States Patent and Trademark Office*